No. 12,388. REISSUED SEPT. 12, 1905.
F. BINS.
SHEPHERD'S CROOK.
APPLICATION FILED APR. 14, 1904.
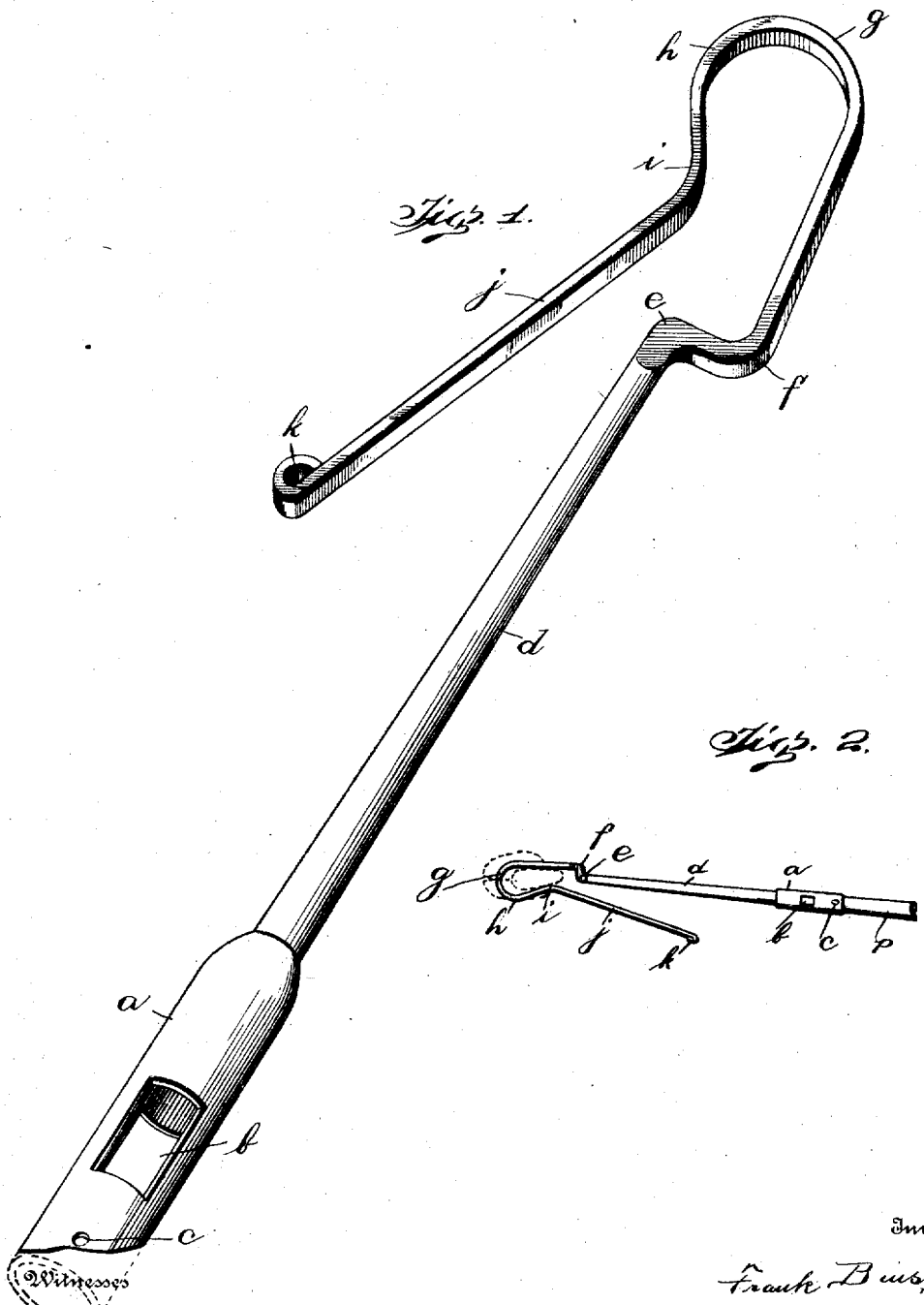
Witnesses
L. Gerrard Handy
N. Curtis Lammond
Inventor
Frank Bins,
By H. S. C. Bliss
Attorney
ANDREW. B. GRAHAM CO., PHOTO-LITHOGRAPHERS, WASHINGTON, D. C.

UNITED STATES PATENT OFFICE.

FRANK BINS, OF FLATWILLOW, MONTANA, ASSIGNOR TO JOHN B. TIMBERLAKE, OF JACKSON, MICHIGAN.

SHEPHERD'S CROOK.

No. 12,388. Specification of Reissued Letters Patent. Reissued Sept. 12, 1905.

Original No. 713,279, dated November 11, 1902. Application for reissue filed April 14, 1904. Serial No. 203,229.

*To all whom it may concern:*

Be it known that I, FRANK BINS, of Flatwillow, in the county of Fergus and State of Montana, have invented certain new and useful Improvements in Shepherds' Crooks; and I hereby declare that the following is a full, clear, and exact description thereof, reference being had to the accompanying drawings, which form part of this specification.

This invention is an improved shepherd's crook for catching and holding animals; and its object is to provide a novel one-piece crook of peculiar form which can be readily engaged and disengaged from an animal's leg, but when engaged will hold the animal securely yet comfortably and prevent it kicking loose, and which can also be readily attached to handles or staffs.

The invention is summarized in the claims following the description, and the accompanying drawings illustrate a crook constructed in accordance therewith.

Figure 1 is a perspective view of the crook, and Fig. 2 is a detail view illustrating the use thereof.

The crook comprises a socket *a*, by which it is attached to a staff or pole *p* of any desired length. Preferably this socket has openings *b* in its sides, which in case the staff should break enable its end to be readily extracted from the socket. The socket may also have holes *c* for passage of nails or screws to fasten it to the staff. From the socket extends the shank *d*, and at the outer end of the shank the crook is bent at right angles to the shank at *e* and then bent outwardly again at *f*, the part between the bends *e f* forming what I term a "positive leg-engaging bend." The crook extends forwardly from bend *f* a short distance and then is bent backwardly upon itself, as at *g*, and returned almost to bend *e*, and then bent outwardly again at *i*. The portion of the crook from *e* to *i* I term the "loop." From bend *i* the crook is extended preferably in a straight line to its end, which may be coiled upon itself, so as to form a blunt point *k*, as shown, which will not injure the stock. The straight portion *j* between *i* and *k* I term the "directing-bar." The bends *i* and *e* are adjacent, the space between them forming a lateral entrance to the loop sufficiently wide to allow the small portion of the leg of a sheep (or other animal to catch which the crook is designed) to enter the loop formed between and within the bends *e* and *i*, as shown. The directing-bar *j* of the crook extends at an angle to the shank *d* and facilitates the catching of an animal's leg. It will be noted that the loop has an inward bend *h* between the points *g* and *i*, which bend is adapted to direct the leg of the animal against the positive leg-engaging bend between points *e* and *f*, which bend will prevent the animal's leg slipping out of the loop by an endwise movement of the crook and will also prevent the animal kicking out of the loop, as can be done with the ordinary styles of crooks, in which the entrance to the loop is at one end thereof, whereas it will be observed in my crook the entrance is at one side of the loop and requires a longitudinal and lateral movement of the crook to engage or disengage it from the animal's leg, although the engagement of the loop or catching of the animal is facilitated by the directing-bar *j* and may be accomplished by merely pulling backward on the crook; but in disengaging the crook a straight push forward thereon would cause the positive leg-engaging bend (or portions between bends *e* and *f*) to bear directly against the leg. Hence in disengaging it is necessary to push the crook forward and to one side, so as to cause the leg to slip out through the lateral opening between the points *e* and *i*. This peculiar construction will prevent an animal kicking out of the crook after its foot is caught in the loop, and by slightly turning the handle and crook it will be impossible for a sheep to free its foot therefrom.

The integral "positive leg-engaging bend," as I term the portion between bends *e* and *f*, is one of the most important features of the crook. It answers the purposes of the spring-catches commonly employed in animal-catching devices without any danger of disarrangement of parts or complicating the construction of crook. I prefer to have the shank *d* circular in cross-section and the remainder of the crook proper oval or band-shaped in cross-section, the corners being rounded, so as not to injure the stock; but the dimensions and cross-section of the crook may be varied to suit the makers and users and is therefore not a material feature of my invention.

The leg-loop is elongated in the general direction of the axis of the shank, as is common in shepherd's crooks; but my crook differs from the earlier forms in this, that the opening or passage into the space inclosed by the leg-loop and to which the directing-bar leads is at one side of such space instead of at the end thereof, so that a simple forward movement of the crook, or what amounts to the same, a back kick of the animal whose leg is in the crook, does not free the leg, as the latter comes into engagement with the rear offset of the loop formed by the positive leg-engaging bend or bar at *e f* instead of passing out through the passage-way. It will be observed that the axis of the longer dimension of the space inclosed by the leg-loop intersects the rear leg-engaging bend at one side of the longitudinal axis of the shank.

Having thus described my invention, what I therefore claim as new, and desire to secure by Letters Patent thereon, is—

1. The herein-described crook, consisting of a socket, a shank, a loop springing from the shank and having the positive leg-engaging bend adjacent to the outer end of the shank, and being bent inward toward the shank and having an inward curve at *h* in the side next the opening, and a directing-bar extending from the loop at an angle to the shank, substantially as set forth.

2. A shepherd's crook having the upper portion of its shank bent outward at right angles, then upward on a line approximately parallel to the main body of the shank, then inwardly curved and finally terminating in a directing-bar bent approximately at an acute angle so as to form a wedge-like entrance to crook, all substantially as shown and described.

3. A shepherd's crook having a directing-bar *j*, the shank, with a permanently-open passage-way between the directing-bar and the shank, and a loop having a rear positive leg-engaging bend adapted to abut squarely against the leg of an animal, and a front leg-engaging bend, said directing-bar, said leg-engaging bends and said shank being formed of one continuous piece of metal, substantially as set forth.

4. A shepherd's crook comprising the shank, a leg-loop having a rear positive leg-engaging bend adapted to abut squarely against the leg of an animal and the front leg-engaging bend, and a directing-bar—the leg-loop being arranged to inclose a space elongated in the general direction of the axis of the shank, the axis of the longer dimension of the space intersecting the leg-engaging bend at one side of the longitudinal axis of the shank, and the directing-bar and shank being arranged to provide a permanent open passage-way leading to the space within the loop, substantially as set forth.

5. A shepherd's crook, having a shank, an elongated leg-loop having a rear positive leg-engaging stop portion and a permanently open passage-way at one side of the leg-engaging portion, and a directing-bar adapted to direct an animal's leg through said passage-way.

6. A shepherd's crook comprising a shank, an elongated leg-loop having oppositely-arranged positive leg-engaging bends, and a passage-way at one side of said loop and between said bends, a portion of said loop extending longitudinally at one side of said passage-way, and a directing-bar carried by the free end of said loop.

In testimony that I claim the foregoing as my own I affix my signature in presence of two witnesses.

FRANK BINS.

In presence of—
JOSEPH W. FULD,
LEON FULD.